(12) United States Patent
Omagari (10) Patent No.: US 12,244,198 B2
(45) Date of Patent: Mar. 4, 2025

(54) STATOR COIL WITH IMPROVED TERMINAL ARRANGEMENT

(71) Applicant: HONDA MOTOR CO., LTD., Tokyo (JP)

(72) Inventor: Kenichi Omagari, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 211 days.

(21) Appl. No.: 18/049,641

(22) Filed: Oct. 26, 2022

(65) Prior Publication Data

US 2023/0155440 A1 May 18, 2023

(30) Foreign Application Priority Data

Nov. 17, 2021 (JP) ................................. 2021-186946

(51) Int. Cl.
*H02K 3/50* (2006.01)
(52) U.S. Cl.
CPC ...................................... *H02K 3/50* (2013.01)
(58) Field of Classification Search
CPC ............ H02K 3/50; H02K 3/505; H02K 3/28; H02K 2203/06; H02K 2203/09
USPC .......................................................... 310/71
See application file for complete search history.

(56) References Cited

U.S. PATENT DOCUMENTS

| | | | |
|---|---|---|---|
| 2010/0219713 A1 | 9/2010 | Staudenmann | |
| 2011/0012472 A1* | 1/2011 | Umeda | H02K 15/0478 310/207 |
| 2011/0175483 A1* | 7/2011 | Koike | H02K 3/12 310/201 |
| 2014/0354094 A1* | 12/2014 | Yazaki | H02K 3/28 310/71 |
| 2016/0072351 A1* | 3/2016 | Mizoue | H02K 3/522 310/71 |

FOREIGN PATENT DOCUMENTS

| | | |
|---|---|---|
| JP | H0622486 A | 1/1994 |
| JP | 2021058076 A | 4/2021 |
| WO | 2019116829 A1 | 6/2019 |

OTHER PUBLICATIONS

Notification of Reasons for Refusal issued in the JP Patent Application No. 2021-186946, mailed on May 30, 2023.

* cited by examiner

*Primary Examiner* — Michael Andrews
(74) *Attorney, Agent, or Firm* — CKC & Partners Co., LLC (57) ABSTRACT

A stator coil includes a coil group of coils of three phases of a U-phase, a V-phase and a W-phase, each including a plurality of straight portions inserted into slots of a stator core, the coil group being folded back in a state where input terminals and midpoint terminals are closely arranged, so that forward portions and backward portions of the plurality of straight portions are laminated, and the input terminals and the midpoint terminals of the respective three-phase coils are alternately arranged in a length direction of the stator coil.

5 Claims, 10 Drawing Sheets

[ Prior Art ]

FIG. 10A

[ Prior Art ]

FIG. 10B

[ Prior Art ]

STATOR COIL WITH IMPROVED TERMINAL ARRANGEMENT

This application is based on and claims the benefit of priority from Japanese Patent Application No. 2021-186946, filed on 17 Nov. 2021, the content of which is incorporated herein by reference.

BACKGROUND OF THE INVENTION

Field of the Invention

The present invention relates to a stator coil.

Related Art

Conventionally, a technology of a stator coil is known, for example, by Patent Document 1, the coil including a coil group of coils of three phases of a U-phase, a V-phase and a W-phase, which is configured by bending one end of each coil, in a state where an input terminal of one end portion of the coil and a midpoint terminal of the other end portion are closely arranged, while forming a straight portion to be inserted into slots of a stator core, and laminating forward portions and backward portions of a plurality of straight portions of the coils.

Patent Document 1: Japanese Unexamined Patent Application, Publication No. 2021-58076

SUMMARY OF THE INVENTION

Figure 8:
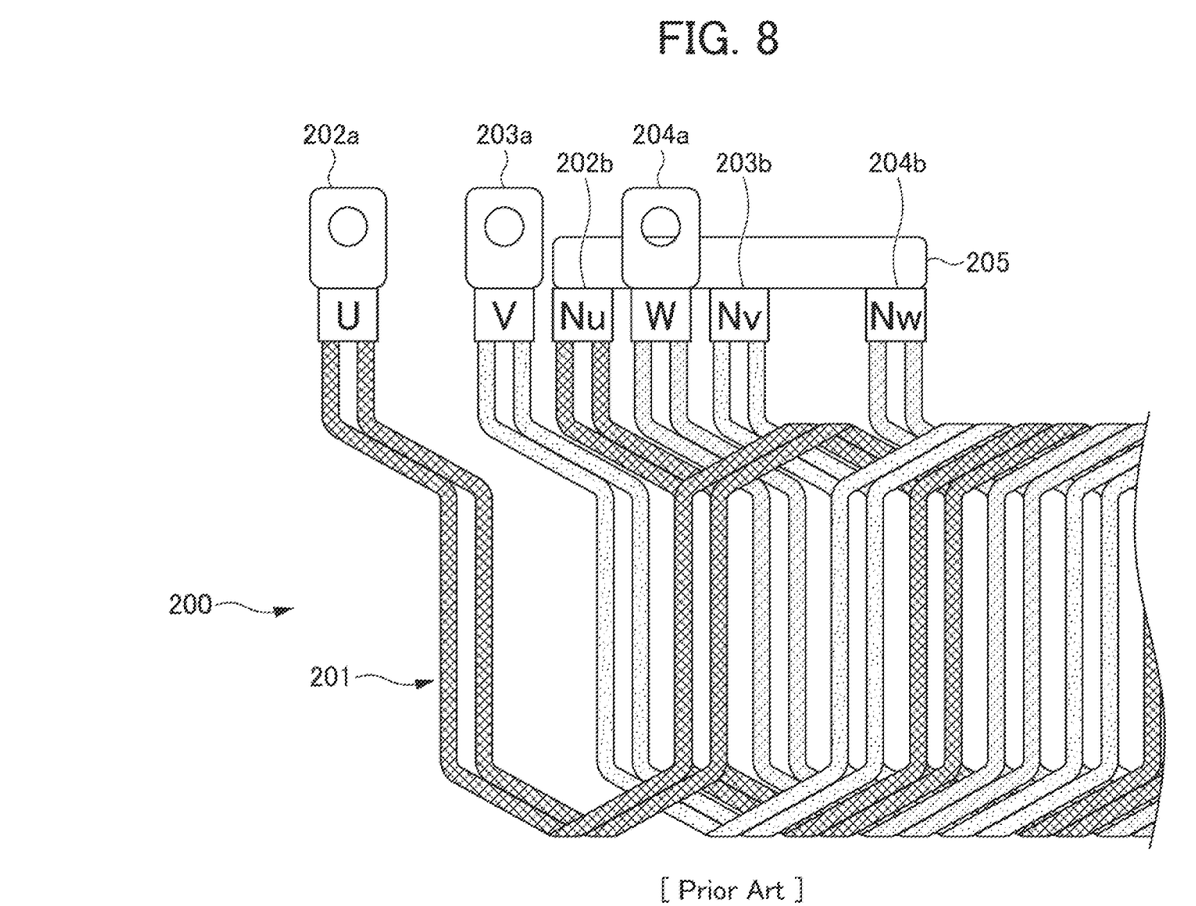
FIG. 8 is a front view showing an example of arrangement of input terminals and midpoint terminals of a conventional stator coil.

Conventionally, as shown in FIG. 8, in a stator coil 200, three input terminals 202a, 203a and 204a of U, V and W at one end of the coil and three midpoint terminals 202b, 203b and 204b of Nu, Nv and Nw at the other end are arranged in order of U, general, VJ, Nu, W, NV, general and Nw, when viewed in a slot arrangement direction of the stator core (arrangement direction of straight portions 201 of the coil). The midpoint terminals 202b, 203b, and 204b are electrically connected to a common connection plate 205. However, in this case, since the input terminals and the midpoint terminals of the coil end portions of respective phases are not continuously arranged, a process of forming the coil into a sheet shape is complicated, and particularly in a braided strip-shaped coil, the forming becomes difficult.

Figure 9:
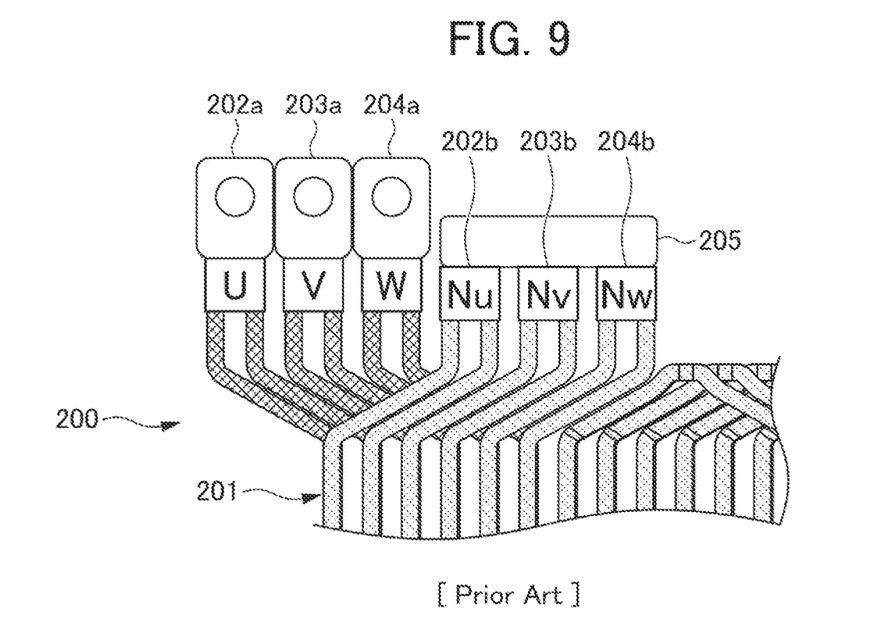
FIG. 9 is a front view showing another example of the arrangement of the input terminals and midpoint terminals of the conventional stator coil.

On the other hand, it is considered that this disadvantage of the stator coil 200 can be solved by closely arranging the input terminals 202a, 203a and 204a and the midpoint terminals 202b, 203b and 204b, for example, as shown in FIG. 9. When the stator coil 200 is viewed in the slot arrangement direction of the stator core (arrangement direction of the straight portions 201 of the coil), the input terminals 202a, 203a and 204a and the midpoint terminals 202b, 203b and 204b are arranged in order of U, V, W, Nu, Nv and Nw.

Figure 10A:
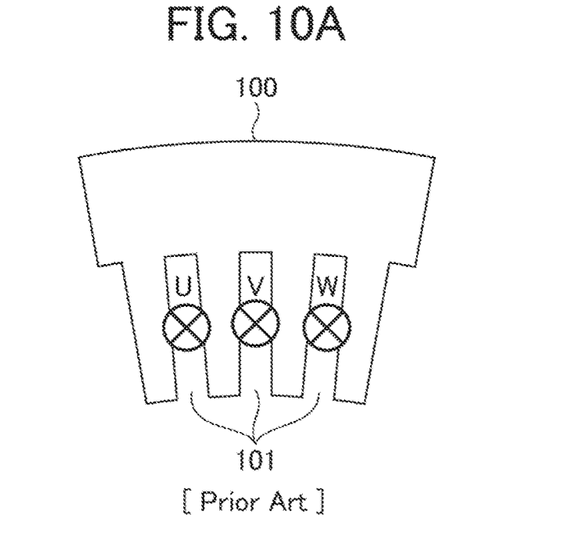
FIG. 10A is a plan view schematically showing a part of a stator to which the conventional stator coil shown in FIG. 9 is mounted.
Figure 10B:
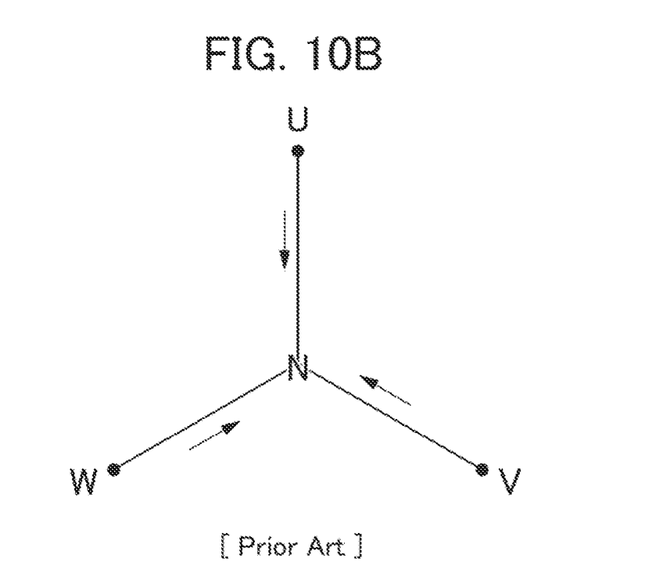
FIG. 10B is an explanatory view of an orientation of current in a stator shown in FIG. 10A.

However, the stator coil 200 shown in FIG. 9 has the following problems. FIG. 10A schematically shows a stator in a case where straight portions of the stator coil shown in FIG. 9 are inserted into each of three adjacent slots 101 of a stator core 100. A cross symbol in a circle depicted in each slot 101 indicates that an orientation of each straight portion 201 of the coil in the slot 101 (orientation of the straight portion 201 from the input terminals 202a, 203a and 204a toward the midpoint terminals 202b, 203b and 204b) is from a front side toward a back side in a perpendicular direction to a paper surface. Therefore, in the stator coil 200 of the configuration shown in FIG. 9, the orientations of the straight portions 201 of the three-phase coils of the U-phase, V-phase and W-phase arranged in the adjacent slots 101 are the same. In this case, an orientation of current to flow through the straight portion 201 in the slot 101 is also the same as an orientation of the straight portion 201 of the coil of each phase. However, in this case, as shown in FIG. 10B, the current flowing through the straight portions 201 in the adjacent slots 101 is only oriented from each input terminal (U, V, W) to the midpoint terminal (N), and hence the current has nowhere to go, so that a rotor disposed in the stator cannot be smoothly rotated.

Therefore, an object of the present invention is to provide a stator coil, in which coils of respective phases can be optimally arranged in slots of a stator core, and which has good formability.

(1) A stator coil according to the present invention is a stator coil (for example, a stator coil 1 described later) including a coil group (for example, a coil group 10 described later) of coils of three phases of a U-phase, a V-phase and a W-phase (for example, a U-phase coil 11, a V-phase coil 12 and a W-phase coil 13 described later), each including a plurality of straight portions (for example, a plurality of straight portions, 111, 121 and 131 described later) inserted into slots (for example, slots 22 described later) of a stator core (for example, a stator core 20 described later), the coil group being folded back in a state where input terminals and midpoint terminals are closely arranged, so that forward portions and backward portions of the plurality of straight portions are laminated, wherein the Input terminals and the midpoint terminals of the respective three-phase coils are alternately arranged in a length direction (for example, an X-direction described later) of the stator coil.

According to the above (1), since the input terminal and the midpoint terminal of each of the three-phase coils are alternately arranged in the length direction of the stator coil, and hence the respective phase coils can be optimally arranged into the slots of the stator core. Since the input terminal and the midpoint terminal of the coil are continuously arranged in the length direction of the stator coil, all the coils can be simultaneously braided, and formability into a sheet shape is satisfactory.

DETAILED DESCRIPTION OF THE INVENTION

Figure 1:
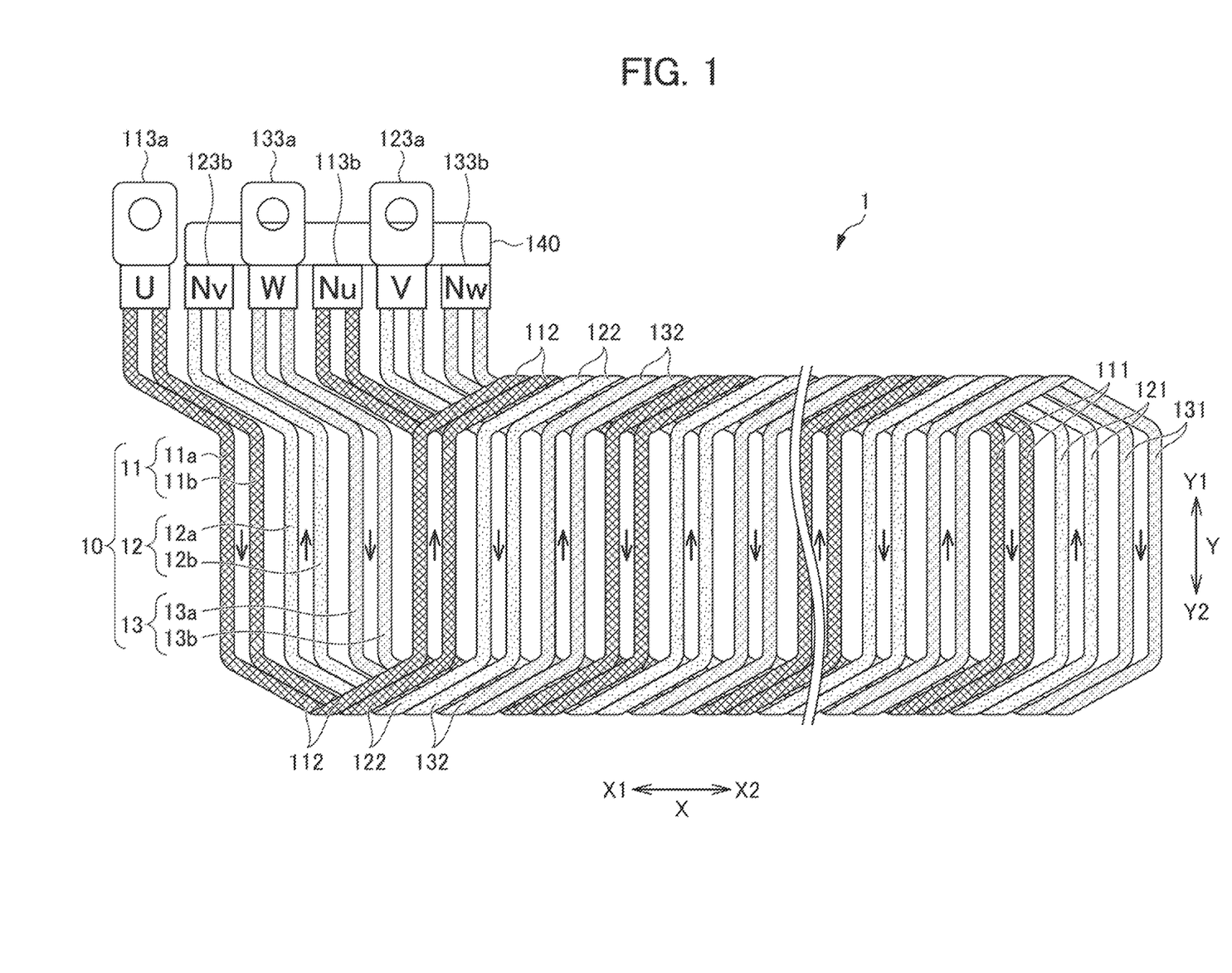
FIG. 1 is a front view of a stator coil according to an embodiment of present invention.

Hereinafter, description will be made as to embodiments of the present invention with reference to the drawings. FIG. 1 is a front view showing a stator coil 1 according to one embodiment of present invention. The stator coil 1 includes a coil group 10 including three-phase coils of a U-phase coil 11, a V-phase coil 12 and a W-phase coil 13 and includes a sheet-like coil formed in a strip shape long in one direction (left-right direction in FIG. 1).

In addition, an X-direction shown in FIG. 1 indicates a length direction of the stator coil 1. This X-direction is a direction along a circumferential direction of a stator core 20 when the stator coil 1 is mounted to the stator core 20 (see FIG. 2). An X1 direction in the X-direction indicates one side of the length direction of the stator coil 1, and an X2 direction indicates the other side of the length direction of the stator coil 1. FIG. 1 shows a Y-direction indicating a width direction of the stator coil 1. This Y-direction corresponds to a direction along an axial direction (perpendicular direction to a paper surface of FIG. 2) of the stator core 20 when the stator coil 1 is mounted to the stator core 20. A Y1 direction in the Y-direction indicates one side in the width direction of the stator coil 1, and a Y2 direction indicates the other side in the width direction of the stator coil 1.

Each of the U-phase coil 11, the V-phase coil 12 and the W-phase coil 13 of the present embodiment includes two coils. Specifically, the U-phase coil 11 is configured by coils 11a and 11b adjacent to each other in the X-direction. The V-phase coil 12 includes coils 12a and 12b adjacent to each other in the X-direction The W-phase coil. 13 includes coils 13a and 13b adjacent to each other in the X-direction.

The U-phase coil 11, the V-phase coil 12 and the W-phase coil 13 include straight portions 111, 121 and 131, and coil end portions 112, 122 and 132, respectively.

The straight portions 111, 121 and 131 are portions inserted into slots 22 of the stator core 20. Each of the straight portions 111, 121 and 131 includes two portions parallel to each other for each phase. All the straight portions 111, 121 and 131 extend along the Y-direction and are arranged in parallel at a predetermined pitch along the X-direction.

The coil end portions 112, 122 and 132 are portions alternately connecting, in a mountain shape in the length direction, the straight portions of each phase that are parallel in the X-direction to each other, that is, end portions of the straight portions 111 and 111 of the U-phase coil 11 to each other, end portions of the straight portions 121 and 121 of the V-phase coil 12 to each other, and end portions of the straight portions 131 and 131 of the W-phase coil 13 to each other. The coil end portions 112, 122 and 132 protrude in a mountain shape on one side (Y1 side) and the other side (Y2 side) in the width direction of the stator coil 1.

The coil end portions 112, 122 and 132 protrude from both end faces of the stator core 20 in the axial direction when the stator coil 1 is mounted in the slots 22 of the stator core 20. The U-phase coil 11, the V-phase coil 12 and the W-phase coil 13 have the straight portions 111, 121 and 131 and the mountain-shaped coil end portions 112, 122 and 132, respectively, forming a continuous wave winding coil folded into a waveform. When the continuous wave winding coil is set in the slots of the stator core, the coil does not require a common mainstream technology of dividing and molding the coil into a plurality of segments and welding coil ends after inserted into slots, and hence, to cope with thermal processing of a welding portion, for example, there is no need to use a high-purity copper material for the coil. Therefore, it is also possible to use a recycled copper material containing impurities, and it is possible to contribute to achieving of recycling of resources. In addition, the wave winding coil does not have to be welded, so that a weight of the coil can be reduced, and a weight of a rotating electric machine using this coil can be reduced. When the rotating electric machine is mounted in a hybrid car, carbon dioxide emissions can be reduced by reducing a vehicle weight, and adverse effects on global environment can be reduced.

The U-phase coil 11, the V-phase coil 12 and the W-phase coil 13 at one end are provided with input terminals 113a, 123a and 133a, respectively. The input terminals 113a, 123a and 133a are electrically connected to two coils of each phase, that is, the coils 11a and 11b, 12a and 12b, and 13a and 13b, respectively.

The input terminals 113a, 123a and 133a are portions that supply power to the U-phase coil 11, the V-phase coil 12 and the W-phase coil 13. The input terminals 113a, 123a and 133a are connected to protrude from the end portions of the straight portions 111, 121 and 131 of the U-phase coil 11, the V-phase coil 12 and the W-phase coil 13 in the width direction of the stator coil 1. Specifically, the input terminals 113a, 123a and 133a are diagonally inclined from the end potions of the straight portions 111, 121 and 131 arranged in endmost portions of the U-phase coil 11, the V-phase coil 12 and the W-phase coil 13 on one end portion side, toward one side (X1 side) of the stator coil 1 in the length direction, at the same inclination angle as in the coil end portions 112, 122 and 132 and are bent toward one side (Y1 side) of the stator coil 1 in the width direction, to extend parallel to the straight portions 111, 121 and 131.

The U-phase coil 11, the V-phase coil 12 and the W-phase coil 13 at the other end are provided with midpoint terminals 113b, 123b and 133b, respectively. The midpoint terminals 113b, 123b and 133b are portions connecting the U-phase coil 11, the V-phase coil 12 and the W-phase coil 13, to form respective midpoints (Nu, Nv, Nw) of the U-phase coil 11, the V-phase coil 12 and the W-phase coil 13. The midpoint terminals 113*b*, 123*b* and 133*b* are electrically connected to two coils of each phase, that is, the coils 11*a* and 11*b*, 12*a* and 12*b*, and 13*a* and 13*b*, respectively. The three midpoint terminals 113*b*, 123*b* and 133*b* are electrically connected to a common connection plate 140 and are put together.

The midpoint terminals 113*b*, 123*b* and 133*b* are connected to protrude from the end portions of the straight portions 111, 121 and 131 of the U-phase coil 11, the V-phase coil 12 and the W-phase coil 13 in the width direction of the stator coil 1. Specifically, the midpoint terminals 113*b*, 123*b* and 133*b* are diagonally inclined from the end potions of the straight portions 111, 121 and 131 arranged in endmost portions of the U-phase coil 11, the V-phase coil 12 and the W-phase coil 13 on the other end portion side, toward the other side (X2 side) of the stator coil 1 in the length direction, at the same inclination angle as in the coil end portions 112, 122 and 132 and are bent toward one side (Y1 side) of the stator coil 1 in the width direction, to extend parallel to the straight portions 111, 121 and 131. As will be described later, the U-phase coil 11, the V-phase coil 12 and the W-phase coil 13 are folded back from the other side (X2 side) toward one side (X1 side), in a middle of the stator coil 1 in the length direction, and hence the midpoint terminals 113*b*, 123*b* and 133*b* after folded as shown in FIG. 1 protrude toward one side (Y1 side) in the width direction of the stator coil 1, in the same arrangement form as in the input terminals 113*a*, 123*a* and 133*a*.

In the stator coil 1, the input terminals 113*a*, 123*a* and 133*a* and the midpoint terminals 113*b*, 123*b* and 133*b* of both the end portions of the U-phase coil 11, the V-phase coil 12 and the W-phase coil 13 are arranged together on one side (X1 side) of the stator coil 1 in the length direction shown in FIG. 1. Specifically, the U-phase coil 11, the V-phase coil 12 and the W-phase coil 13 are continuously formed into the waveform along the length direction of the stator coil 1, folded back from the other side (X2 side) to one side (X1 side) in the middle, and braided. When the U-phase coil 11, the V-phase coil 12 and the W-phase coil 13 are folded back, the input terminals 113*a*, 123*a* and 133*a* and the midpoint terminals 113*b*, 123*b* and 133*b* of the respective phases are closely arranged and arranged at the same pitch as a pitch of the straight portions 111, 121 and 131 of the respective phases. The U-phase coil 11, the V-phase coil 12 and the W-phase coil 13 are folded back in the middle of the length direction, so that forward portions (straight portions 111, 121 and 131 before folded back) and backward portions (straight portions 111, 121 and 131 after folded back) of the straight portions 111, 121 and 131 are laminated every phase.

Thereby, the input terminals 113*a*, 123*a* and 133*a* and the midpoint terminals 113*b*, 123*b* and 133*b* are all orderly arranged to protrude in the same direction on one side (Y1 side) of the width direction and on one side (X1 side) of the length direction of the stator coil 1 as shown in FIG. 1. The laminated straight portions 111, 121 and 131 are oriented in the same direction as each other. The orientation of the straight portions 111, 121 and 131 is a direction from the input terminals 113*a*, 123*a* and 133*a* toward the midpoint terminals 113*b*, 123*b* and 133*b*. Specifically, the straight portions 111, 121 and 131 of the same phase laminated on each other have the same orientation from one side (Y1 side) to the other side (Y2 side) or from the other side (Y2 side) to one side (Y1 side) in the width direction of the stator coil 1.

Here, as shown in FIG. 1, the input terminals 113*a*, 123*a* and 133*a* and the midpoint terminals 113*b*, 123*b* and 133*b* of the U-phase coil 11, the V-phase coil 12 and the W-phase coil 13, respectively, are alternately arranged at a constant pitch along the length direction of the stator coil 1. In the present embodiment, from one side (X1 side) toward the other side (X2 side) in the length direction of stator coil 1, the input terminal 113*a* of the U-phase coil 11, the midpoint terminal 123*b* of the V-phase coil 12, the input terminal 133*a* of the W-phase coil 13, the midpoint terminal 113*b* of the U-phase coil 11, the input terminal 123*a* of the V-phase coil 12 and the midpoint terminal 133*b* of the W-phase coil 13 are arranged in order (U, Nv, W, Nu, V and Nw). Therefore, also in the straight portions 111, 121 and 131 and the coil end portions 112, 122 and 132 of the U-phase coil 11, the V-phase coil 12 and the W-phase coil 13, respectively, from one side (X1 side) toward the other side (X2 side), the forward portion of the U-phase coil 11, the backward portion of the V-phase coil 12, the forward portion of the W-phase coil 13, the backward portion of the U-phase coil 11, the forward portion of the V-phase coil 12 and the backward portion of the W-phase coil 13 are arranged in order.

In the stator coil 1 formed in a form of a strip-shaped sheet in this way, as shown with arrows in FIG. 1, the straight portions 111, 121 and 131 are oriented and alternately arranged for each phase in the orientation from one side (Y1 side) to the other side (Y2 side) in the width direction of the stator coil 1 and the orientation from the other side (Y2 side) to one side (Y1 side), in order from the one side (X1 side) toward the other side (X2 side) in the length direction of the stator coil 1.

Figure 2:
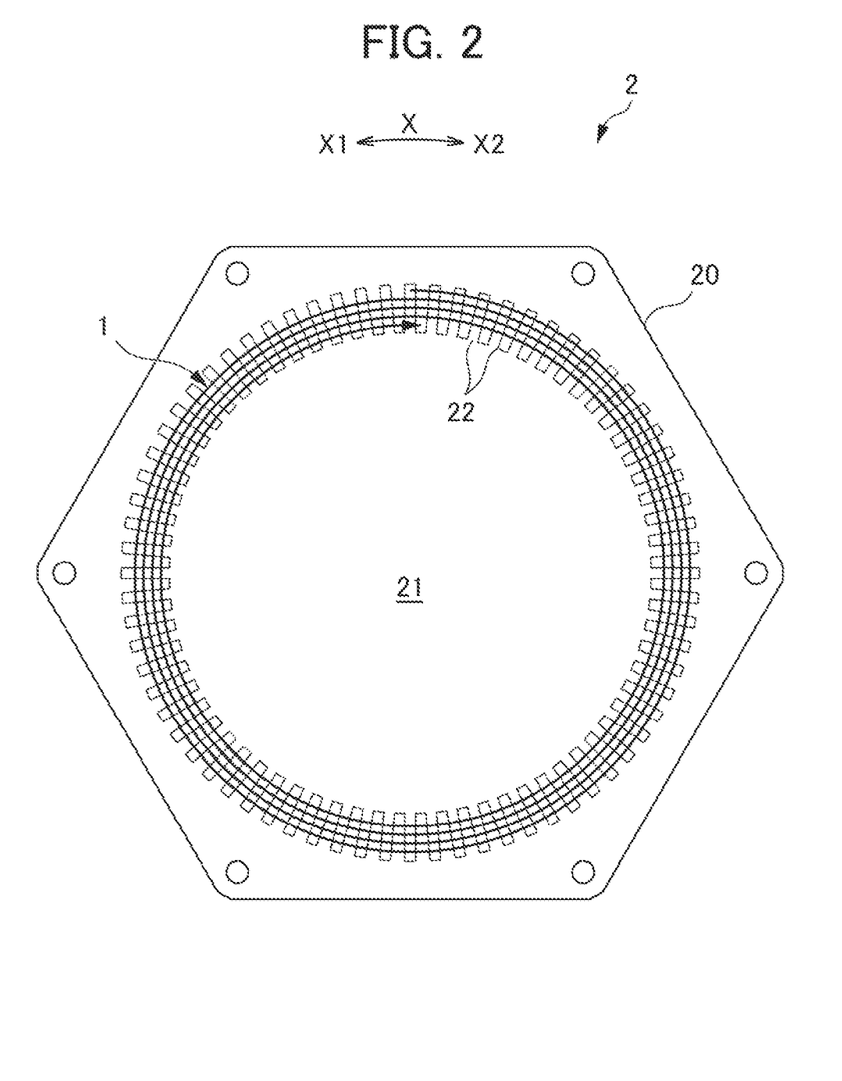
FIG. 2 is a plan view showing a behavior in mounting the stator coil according to the embodiment of present invention in a stator core.

As shown in FIG. 2, the stator coil 1 is mounted in the stator core 20 by inserting the straight portions 111, 121 and 131 into the slots 22, respectively, from a central shaft hole 21 side of the stator core 20. Thereby, a stator 2 is configured. The length direction of the stator coil 1 of the present embodiment has a length of four circumferences in a circumferential direction of the stator core 20. Therefore, the stator coil 1 is wound around four circumferences and mounted in the stator core 20. In one circumference of the stator coil 1, since the straight portions 111, 121 and 131 of the forward portions and the backward portions are laminated on each other for each phase, and the stator coil 1 is wound around four circumferences of the stator core 20, so that in each slot 22, eight layers of the straight portions 111, 121 and 131 are laminated and arranged in a radial direction.

Figure 3A:
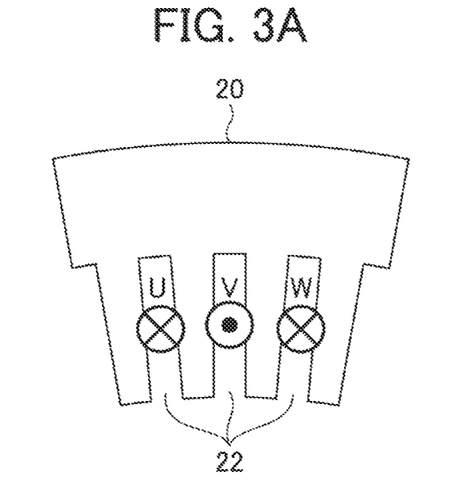
FIG. 3A is a plan view schematically showing a part of the stator to which a part of the stator coil according to the embodiment of present invention is mounted.

FIG. 3A schematically shows the stator 2 in a case where the straight portions 111, 121 and 131 of the stator coil 1 shown in FIG. 1 are inserted into three adjacent slots 22 of the stator core 20. FIG. 3A schematically shows four layers among the eight layers of the straight portions 111, 121 and 131 inserted into the slots 22 with a cross symbol in a circle and a dot symbol in a circle. The cross symbol in the circle depicted in the slot 22 indicates that the straight portions 111, 121 and 131 of the coils in the slot 22 are oriented from a front side toward a back side in the perpendicular direction to the paper surface. The dot symbol in the circle depicted in the slot 22 indicates that the straight portions 111, 121 and 131 of the coils in the slot. 22 are oriented from the back side toward the front side in the perpendicular direction to the paper surface.

Figure 3B:
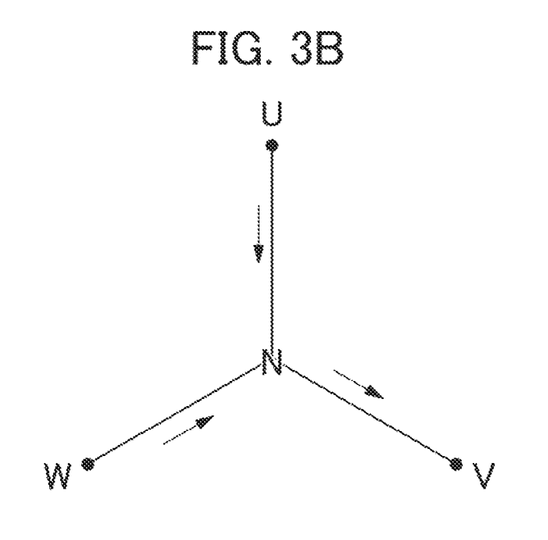
FIG. 3B is an explanatory view of an orientation of current in the stator shown in FIG. 3A.

Thus, when the stator coil 1 including the configuration shown in FIG. 1 is mounted in the stator core 20, the orientations of the straight portions 111, 121 and 131 of the U-phase coil 11, the V-phase coil 12 and the W-phase coil 13 arranged in the adjacent slots 22 turn to an opposite orientation in any one of the three phases. In FIG. 3A, the orientation of the straight portion 121 of the V-phase coil 12 only turns to the opposite orientation, and the orientations of the straight portions 111, 121 and 131 of the U-phase coil 11, the V-phase coil 12 and the W-phase coil 13 are arranged so that the orientations sequentially turn to the opposite orientation in the circumferential direction of the stator core 20. Thus, when the stator coil 1 is mounted in the slots 22 of the stator core 20, the orientation of the straight portion 121 of the V-phase coil 12 only differs with respect to an orientation of current to flow through the straight portions 111, 121 and 131 in the slots 22, and hence, as shown in FIG. 3B, current flows toward the input terminal 123a of the V-phase coil 12, so that a rotor (not shown) disposed in the shaft hole 21 of the stator core 20 can be smoothly rotated.

Figure 4:
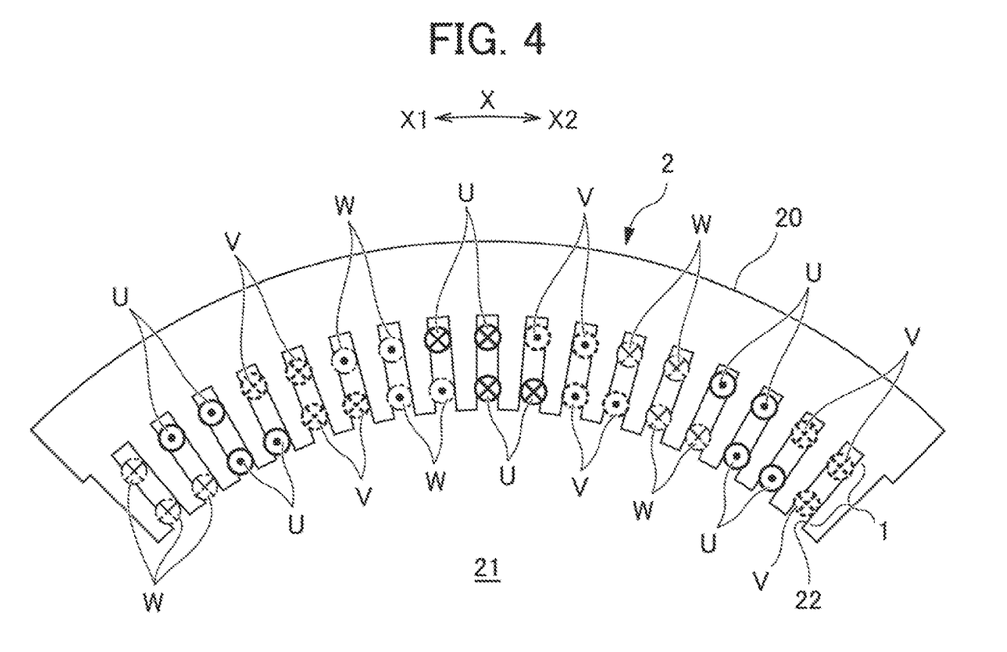
FIG. 4 is a plan view schematically showing a part of the stator to which the stator coil according to the embodiment of present invention is mounted.

FIG. 4 schematically shows a part of the stator 2 with the stator coil 1 mounted in the stator core 20. Cross symbols in circles and dot symbols in circles are arranged in the circumferential direction of the stator core 20, to schematically show four layers of the straight portions 111, 121 and 131. In each slot 22, two symbols are arranged, to indicate that eight layers of the straight portions 111, 1.21 and 131 are inserted in a radial direction of the stator core 20. In addition, four layers of the straight portions 111, 121 and 131 of the U-phase coil 11, the V-phase coil 12 and the W-phase coil 13 outside in the radial direction shift by one slot in the circumferential direction from four layers inside in the radial direction.

Figure 5:
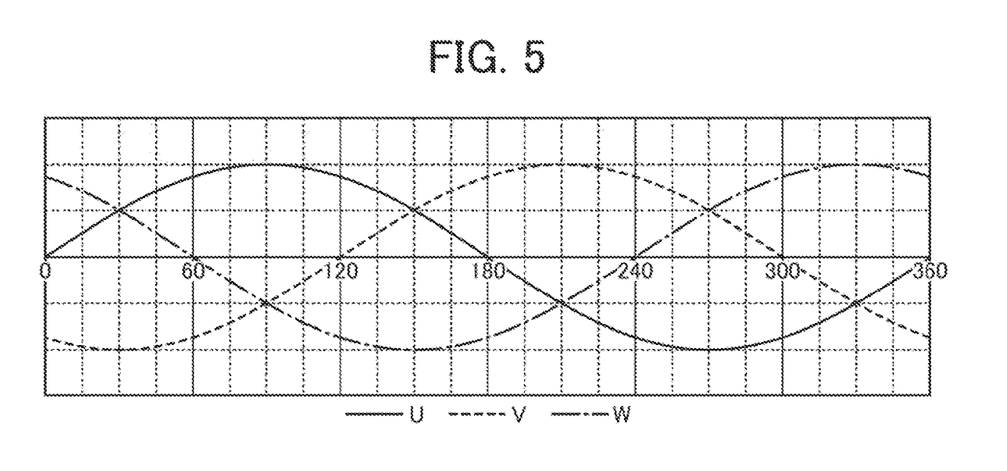
FIG. 5 is a graph showing a current waveform in a case where current is supplied to each phase coil in the stator shown in FIG. 4.
Figure 6A:
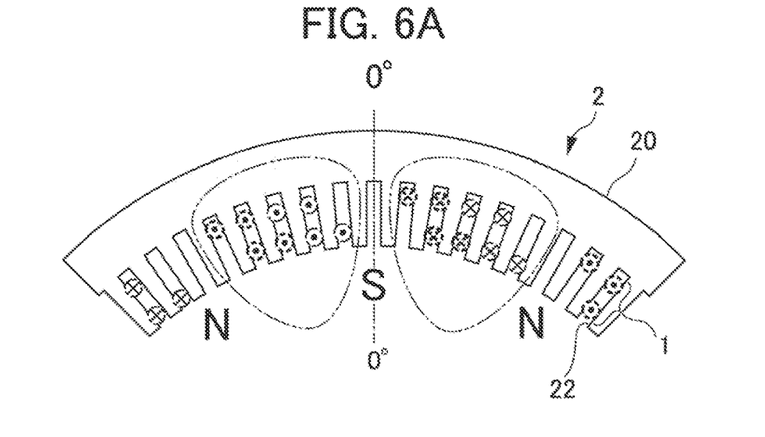
FIG. 6A is a view showing a phase of an S-pole and an N-pole with respect to an electrical angle of 0 degrees of the stator shown in FIG. 4.
Figure 6B:
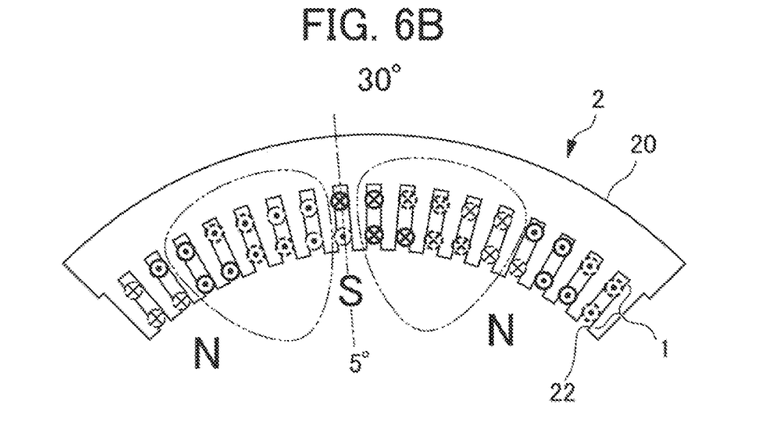
FIG. 6B is a view showing a phase of the S-pole and the N-pole with respect to an electrical angle of 30 degrees of the stator shown in FIG. 4.
Figure 6C:
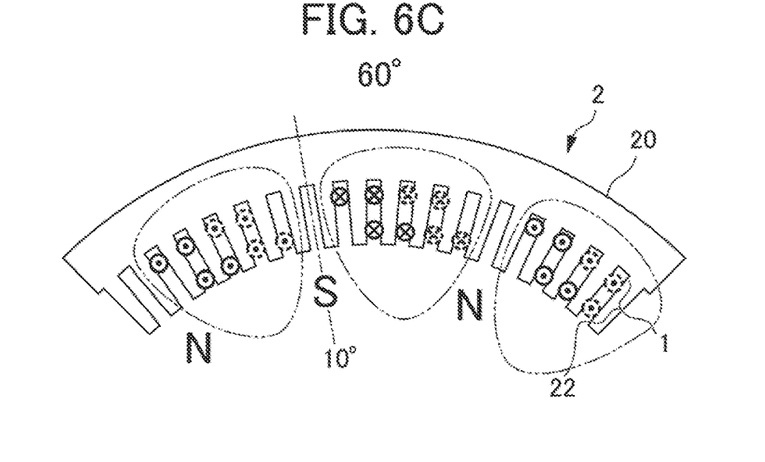
FIG. 6C is a view showing a phase of the S-pole and the N-pole with respect to an electrical angle of 60 degrees of the stator shown in FIG. 4.
Figure 6D:
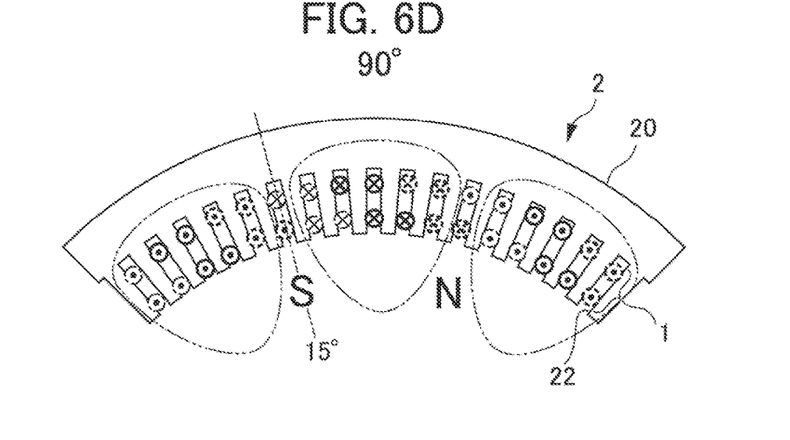
FIG. 6D is a view showing a phase of the S-pole and the N-pole with respect to an electrical angle of 90 degrees of the stator shown in FIG. 4.
Figure 6E:
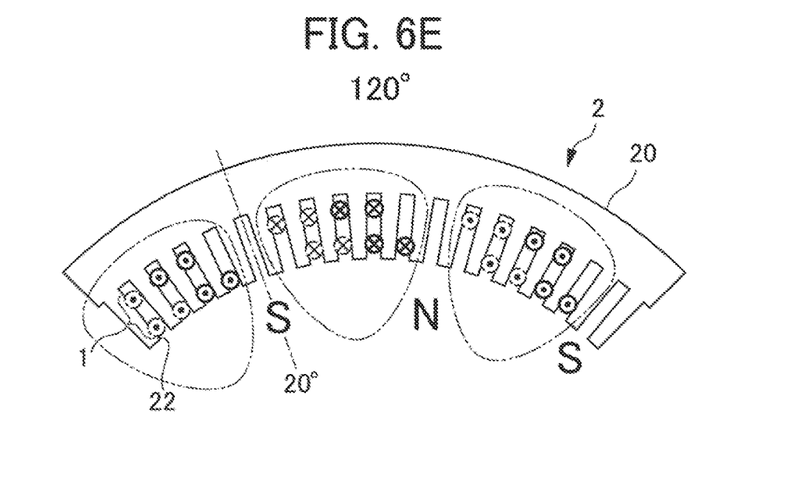
FIG. 6E is a view showing a phase of the S-pole and the N-pole with respect to an electrical angle of 120 degrees of the stator shown in FIG. 4.
Figure 6F:
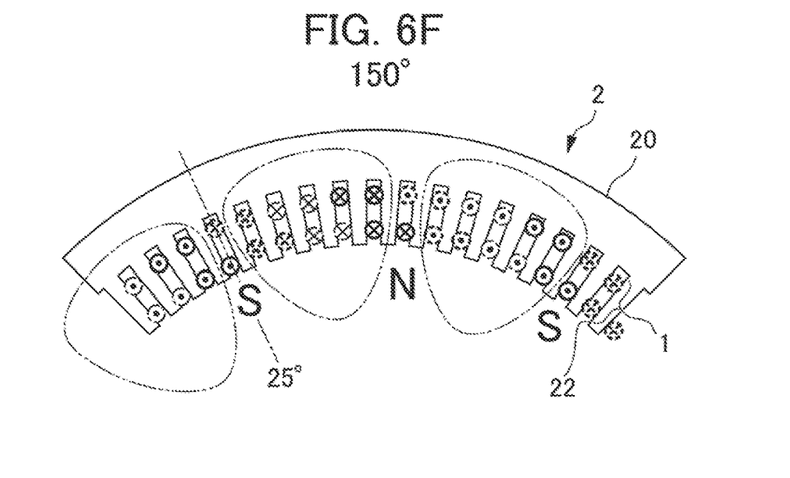
FIG. 6F is a view showing a phase of the S-pole and the N-pole with respect to an electrical angle of 150 degrees of the stator shown in FIG. 4.

FIG. 5 shows a current waveform in a case where current is supplied to the input terminals 113a, 123a and 133a of the U-phase coil 11, the V-phase coil 12 and the W-phase coil 13 in the stator 2 shown in FIG. 4. A vertical axis indicates a magnitude of current and a horizontal axis shows an electrical angle. As shown in FIG. 5, it is seen that in the stator 2 with the stator coil 1 mounted in the stator core 20, current of each of the phases of the U-phase coil 11, the V-phase coil 12 and the W-phase coil 13 maintains each phase at an electrical angle of 120 degrees and smoothly changes in time series.

FIGS. 6A to 6F show phases of an S-pole and an N-pole with respect to the electrical angle of the stator 2 shown in FIG. 4. In the drawings, cross symbols in circles and dot symbols in circles depicted in the slots 22 indicate orientations of current in a U-phase (solid circle), a V-phase (dashed circle) and a W-phase (dashed chain line circle). The cross symbols in the circles indicate that current flowing through each of the straight portions 111, 121 and 131 of the coils in the slots 22 is oriented from a front side toward a back side in a perpendicular direction to a paper surface. The dot symbols in the circles indicate that current flowing through each of the straight portions 111, 121 and 131 of the coils in the slots 22 is oriented from the back side toward the front side in the perpendicular direction to the paper surface. Also, the drawings depict a position of a magnetic pole S/N generated when current is supplied to the input terminals 113a, 123a and 133a of the U-phase coil 11, the V-phase coil 12 and the W-phase coil 13 in the stator 2 shown in FIG. 4. In each of FIGS. 6A to 6F, a numeral outside the radial direction of the stator 2 indicates the electrical angle, and a numeral inside the radial direction indicates a phase (mechanical angle) of the S-pole. As shown in FIGS. 6A to 6F, it is seen that when current is supplied to the U-phase coil 11, the V-phase coil 12 and the W-phase coil 13 of the stator coil 1, the phase of the S-pole also smoothly moves as the electrical angle of the stator 2 progresses.

As described above, the stator coil 1 includes the coil group 10 including the U-phase coil 11, the V-phase coil 12 and the W-phase coil. 13, each including the plurality of straight portions 111, 121 and 131 inserted into the slots 22 of the stator core 20, the coil group being folded back in the state where the input terminals 113a, 123a and 133a and the midpoint terminals 113b, 123b and 133b are closely arranged, so that the forward portions and backward portions of the plurality of straight portions 111, 121 and 131 are laminated, wherein the input terminals 113a, 123a and 133a and the midpoint terminals 113b, 123b and 133b of the U-phase coil 11, the V-phase coil 12 and the W-phase coil 13 are alternately arranged in the length direction of the stator coil 1, so that the coils of the respective phases can be optimally arranged into the slots 22 of the stator core 20. Additionally, since the input terminals 113a, 123a and 133a and the midpoint terminals 113b, 123b and 133b of the U-phase coil 11, the V-phase coil 12 and the W-phase coil 13 are continuously arranged in the length direction of the stator coil 1, all the coils of the U-phase coil 11, the V-phase coil 12 and the W-phase coil 13 can be simultaneously braided, and formability into a sheet shape is satisfactory.

Figure 7:
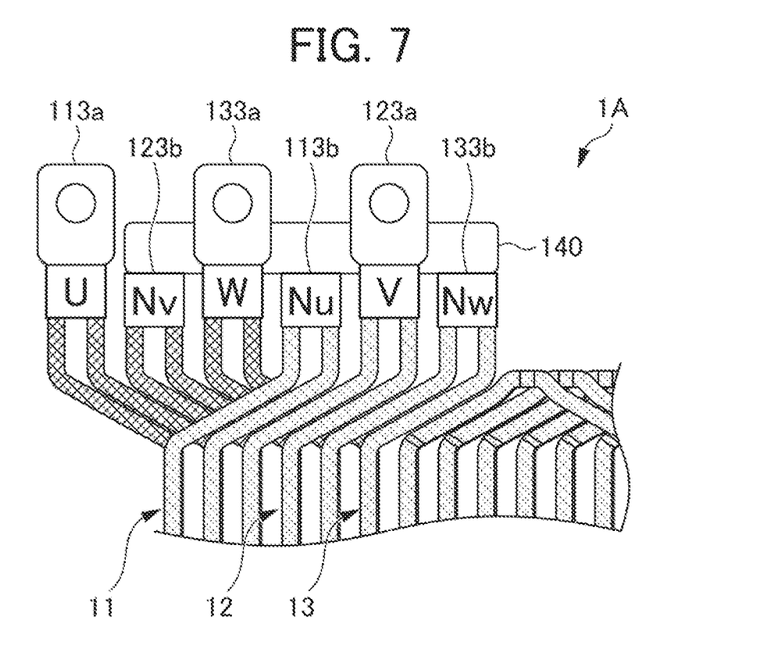
FIG. 7 is a front view showing an end portion of a stator coil according to another embodiment of present invention.

In addition, the stator coil is not limited to the coil formed by braiding the U-phase coil 11, the V-phase coil 12 and the W-phase coil 13 as shown in FIG. 1. For example, as in a stator coil 1A shown in FIG. 7, an input terminal 123a and a midpoint terminal 123b only of a V-phase coil 12 may be arranged on an opposite end portion side to input terminals 113a and 133a and midpoint terminals 113b and 133b of a U-phase coil 11 and a W-phase coil 13, and the U-phase coil 11, the V-phase coil 12 and the W-phase coil 13 may be simply folded back in a middle and laminated in a state where the input terminals 113a, 123a and 133a and the midpoint terminals 113b, 123b and 133b are closely arranged.

EXPLANATION OF REFERENCE NUMERALS 1 stator coil
coil group
11 U-phase coil
12 V-phase coil
13 W-phase coil
stator core
22 slot
111, 121 and 131 straight portion
113a, 123a and 133a input terminal
113b, 123b and 133b midpoint terminal
X length direction of the stator coil

What is claimed is:

1. A stator coil comprising a coil group of three-phase coils of a U-phase, a V-phase and a W-phase mounted in a circumferential direction of a stator core, each including a plurality of straight portions extending in an axial direction of the stator core and into slots of the stator core, the three-phase coils each including an input terminal at one end in an extension direction of the three-phase coils and a midpoint terminal at an other end
  wherein the coil group is folded back in the circumferential direction of the stator coil at a folded-back portion arranged in a middle so that the input terminal and the midpoint terminal of each of the three-phase coils are arranged together at an opposite end of the stator core in the circumferential direction with respect to the folded-back portion in the coil group resulting in forward portions and backward portions of the plurality of straight portions being laminated in a radial direction of the stator core,
  the input terminals and the midpoint terminals of the respective three-phase coils are alternately arranged in the circumferential direction of the stator core.

2. The stator coil according to claim 1, wherein the plurality of straight portions of the coil group are arranged such that an orientation in the axial direction of the stator core of each of the plurality of straight portions from the input terminal toward the midpoint terminal alternate in the circumferential direction of the stator core.

3. The stator coil according to claim 1, wherein the three-phase coils each include two coils parallel to each other in the circumferential direction of the stator core.

4. The stator coil according to claim 1, wherein the forward portions and the backward portions of the plurality of straight portions are laminated in the circumferential direction of the stator core for every phase.

5. The stator coil according to claim 1, wherein the stator coil has a length of four circumferences in the circumferential direction of the stator core.

* * * * *